H. J. BEHRENS.
SAWING STONE.

No. 15,410.  Patented July 29, 1856.

UNITED STATES PATENT OFFICE.

HENRY J. BEHRENS, OF NEW YORK, N. Y.

MACHINE FOR SAWING STONE IN TAPERING FORM.

Specification of Letters Patent No. 15,410, dated July 29, 1856.

*To all whom it may concern:*

Be it known that I, H. J. BEHRENS, of the city, county, and State of New York, have invented a new and useful Improvement in Sawing Stone; and I do hereby declare the following to be a full, clear, and exact description thereof, reference being had to the accompanying drawing, in which—

Figure 1:
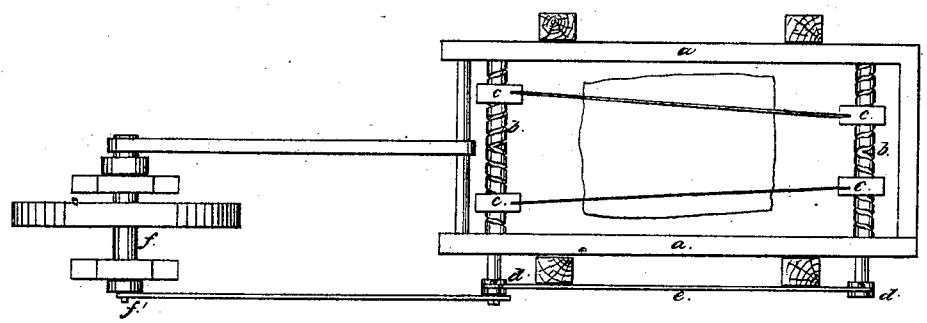
Figure 2:
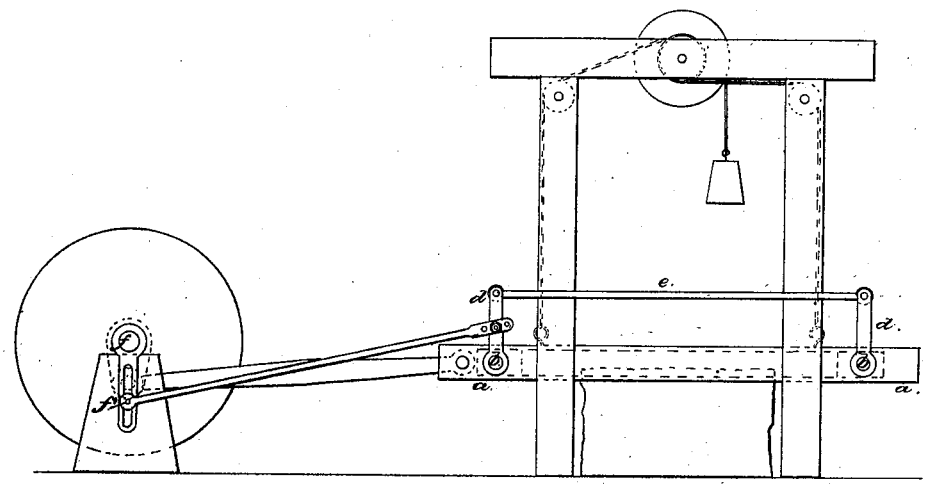

Figure 1, is a top plan. Fig. 2, is a side elevation.

The nature of my improvement consists in making the saws in the same frame approach toward and recede from each other as the frame vibrates so that when the saws are placed in an angular position toward each other they shall saw in a straight line thus sawing a taper slab.

The construction is as follows. I form the saw frame, suspend and work it in the most approved manner, these parts being no new invention of mine will need no further description; but in the saw frame $a$, near each end thereof, I place two screws $b$, with a thread cut thereon right and left from the center, as clearly shown by the drawings. On these threads I put nuts $c$, one or more on each side of the center line, and to these I affix my saws, as shown in Fig. 1. By this arrangement it will be seen I can incline the saws to any degree required, within the limits of the machine.

The screws project through and beyond one side of the frame and have arms $d$ connected therewith, the arms of the two screws are connected by a coupling bar $e$ so as to be turned exactly the same distance, and at the same time. Now it will be obvious if these screws are turned either way it will cause the saws to move sidewise either toward or from each other a distance proportionate to the revolution of the screw, and the pitch of the thread, and if this is done at the same time the saw frame is vibrated and in a degree proportionate to the inclination of the saws they will be made to saw on a straight line but at an inclination to the line of motion of the carriage and thus saw a taper slab which is the object in view.

To turn the screws as above described I connect the arms $d$ with an eccentric or crank pin $f'$ on the shaft $f$ that drives the saws, and by adjusting the length of sweep of the crank pin, or the distance from the screw of the connection between the eccentric rod and the arm $d$ the change can be effected. It is obvious if a straight running saw was put in the center between the two inclined ones and unconnected with screw that two taper slabs would be cut and if one taper or inclined saw was used with a straight one the same result would be produced or if straight and taper saws were alternated the same result would be effected.

I do not claim giving the saws a compound motion irrespective of the means, but

Having thus fully described my improvements in taper sawing what I claim therein as new is—

Giving to a saw placed in a line inclined to the line of motion of the saw frame a lateral motion independent of the motion of the frame or at right angles to the line of motion thereof, by means of the several devices, substantially in the manner and for the purposes set forth.

HENRY T. BEHRENS.

Witnesses:
JOHN E. NEILL,
BENJAMIN E. NEILL.